(12) United States Patent
Cosby et al.

(10) Patent No.: US 12,248,680 B2
(45) Date of Patent: Mar. 11, 2025

(54) SYSTEMS AND METHODS FOR IMPLEMENTING MAINTENANCE OPERATIONS ON STORAGE DEVICES IN PLACE OF DRIVE-BASED MAINTENANCE ROUTINES

(71) Applicant: Lenovo Enterprise Solutions (Singapore) PTE Ltd., Singapore (SG)

(72) Inventors: David Cosby, Morrisville, NC (US); Wilson Velez, Morrisville, NC (US); Patrick Caporale, Morrisville, NC (US); Zezhi Hu, Morrisville, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 0 days.

(21) Appl. No.: 17/855,560

(22) Filed: Jun. 30, 2022

(65) Prior Publication Data
US 2024/0004553 A1    Jan. 4, 2024

(51) Int. Cl.
*G06F 3/06*     (2006.01)
(52) U.S. Cl.
CPC .......... *G06F 3/0614* (2013.01); *G06F 3/0629* (2013.01); *G06F 3/0683* (2013.01)
(58) Field of Classification Search
None
See application file for complete search history.

(56) References Cited

U.S. PATENT DOCUMENTS

| | | | |
|---|---|---|---|
| 7,313,721 B2 | 12/2007 | Ashmore | |
| 9,262,424 B1* | 2/2016 | Si | G06F 16/2365 |
| 9,740,426 B2* | 8/2017 | Lee-Baron | G06F 3/065 |
| 11,768,615 B1* | 9/2023 | Zhou | G06F 3/0631 |
| | | | 711/170 |
| 2018/0253347 A1* | 9/2018 | Shigeta | G06F 11/073 |
| 2022/0236882 A1* | 7/2022 | Koseki | G06F 3/0617 |
| 2023/0359356 A1* | 11/2023 | Zhou | G06F 3/0683 |

* cited by examiner

*Primary Examiner* — Charles Rones
*Assistant Examiner* — Ryan Dare
(74) *Attorney, Agent, or Firm* — Olive Law Group, PLLC

(57) ABSTRACT

Systems and methods for implementing maintenance operations on storage devices in place of drive-based maintenance operations are disclosed. According to an aspect, a system includes a storage controller configured to receive a plurality of media scan configurations for maintenance from a plurality of storage devices. The data maintenance algorithms implemented across storage device and storage controller is also configured to tune and/or disable drive-based maintenance routines on one or more of the plurality of storage devices. Further, the BMC and/or storage controller is configured to perform controller-based maintenance operations in replacement of the drive-based maintenance routines of the one or more of the plurality of storage devices based on the received plurality of media scan configurations.

20 Claims, 3 Drawing Sheets

SYSTEMS AND METHODS FOR IMPLEMENTING MAINTENANCE OPERATIONS ON STORAGE DEVICES IN PLACE OF DRIVE-BASED MAINTENANCE ROUTINES

TECHNICAL FIELD

The presently disclosed subject matter relates generally to storage device management. Particularly, the presently disclosed subject matter relates to systems and methods for implementing maintenance operations on storage device in place of drive-based maintenance routines.

BACKGROUND

A server farm or cluster has multiple server computers that provide various functionalities to remote client computers. An important function performed at a server farm is data storage and management. Clients use servers to reliably and securely store their data on storage devices of the server computers, to provide access to the stored data, and to receive additional data from the clients for storage.

A common data storage system used by servers is RAID technology. RAID combines several physical storage devices (e.g., disk drives) into one or more logical units for providing data redundancy and/or improving data storage performance. In a RAID environment, data is distributed across a server's storage devices. The data can be distributed in one of several ways, referred to as RAID levels, depending on a required level of performance and redundancy. There can be different techniques of data distribution among the drives. Each of the techniques can provide a different balance among goals of optimizing capacity, availability, performance, and reliability.

Drive data can deteriorate over time, thus requiring periodic disk and array maintenance to read and possibly rewrite or relocate data. A storage controller, such as a RAID controller, can implement such maintenance routines in the form of patrol reads (PR) or consistency checks (CC) across their arrays. These maintenance operations or routines can sometimes be independently conducted such that there is redundant maintenance among the drives. For example, some drive manufacturer and storage device controller implementations protect their individual interests. In one instance, a drive manufacturer may request an interval to keep data reliable, and the storage device controller may default to a setting to keep the array reliable. These different implementations can result in redundant maintenance, which is sometimes at the cost of wear on drives. In addition, these different implementations can lead to inefficiency. Therefore, for at least these reasons, there is a need for minimizing wasteful drive maintenance.

BRIEF DESCRIPTION OF THE DRAWINGS

Figure 1:
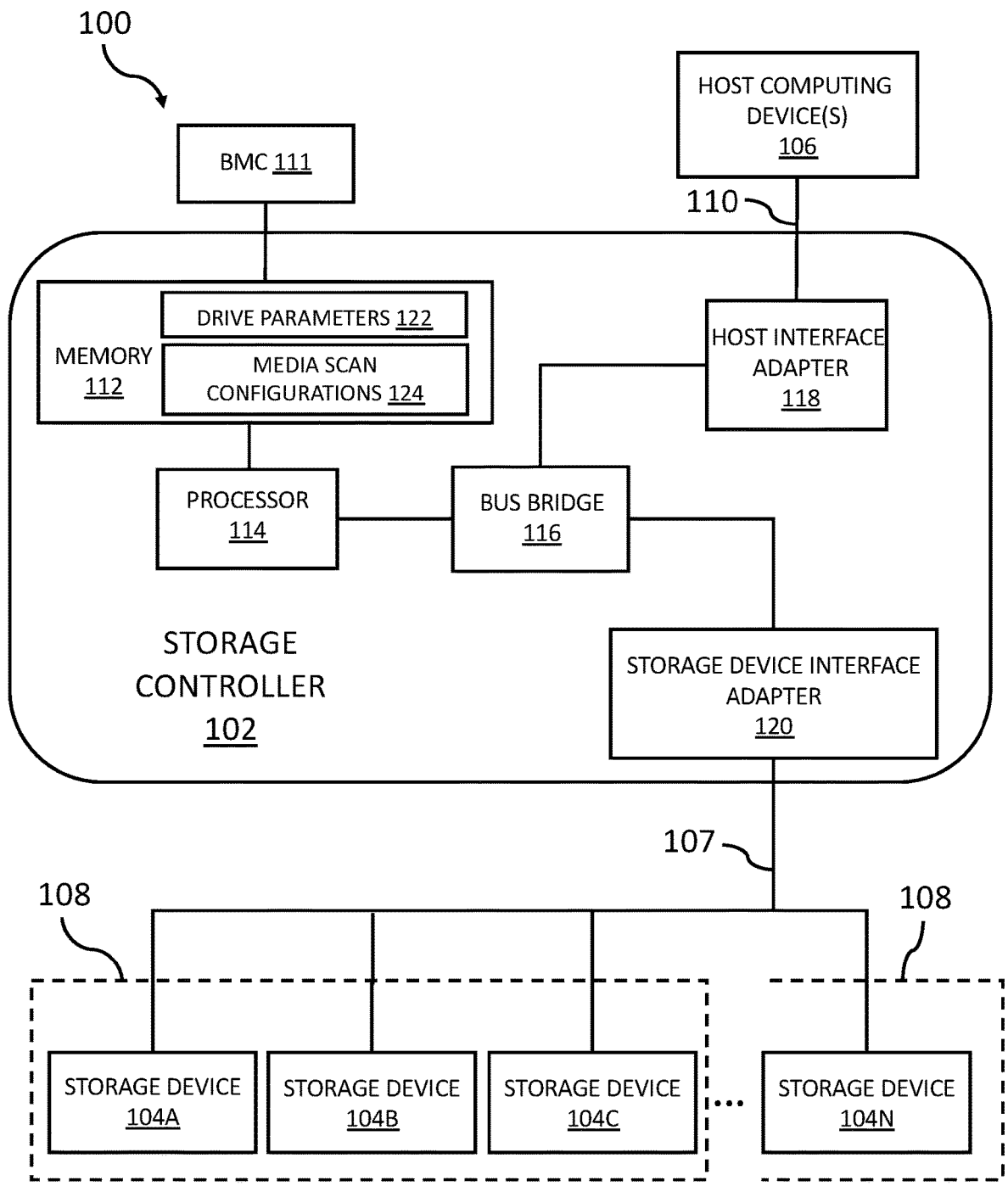
Figure 2:
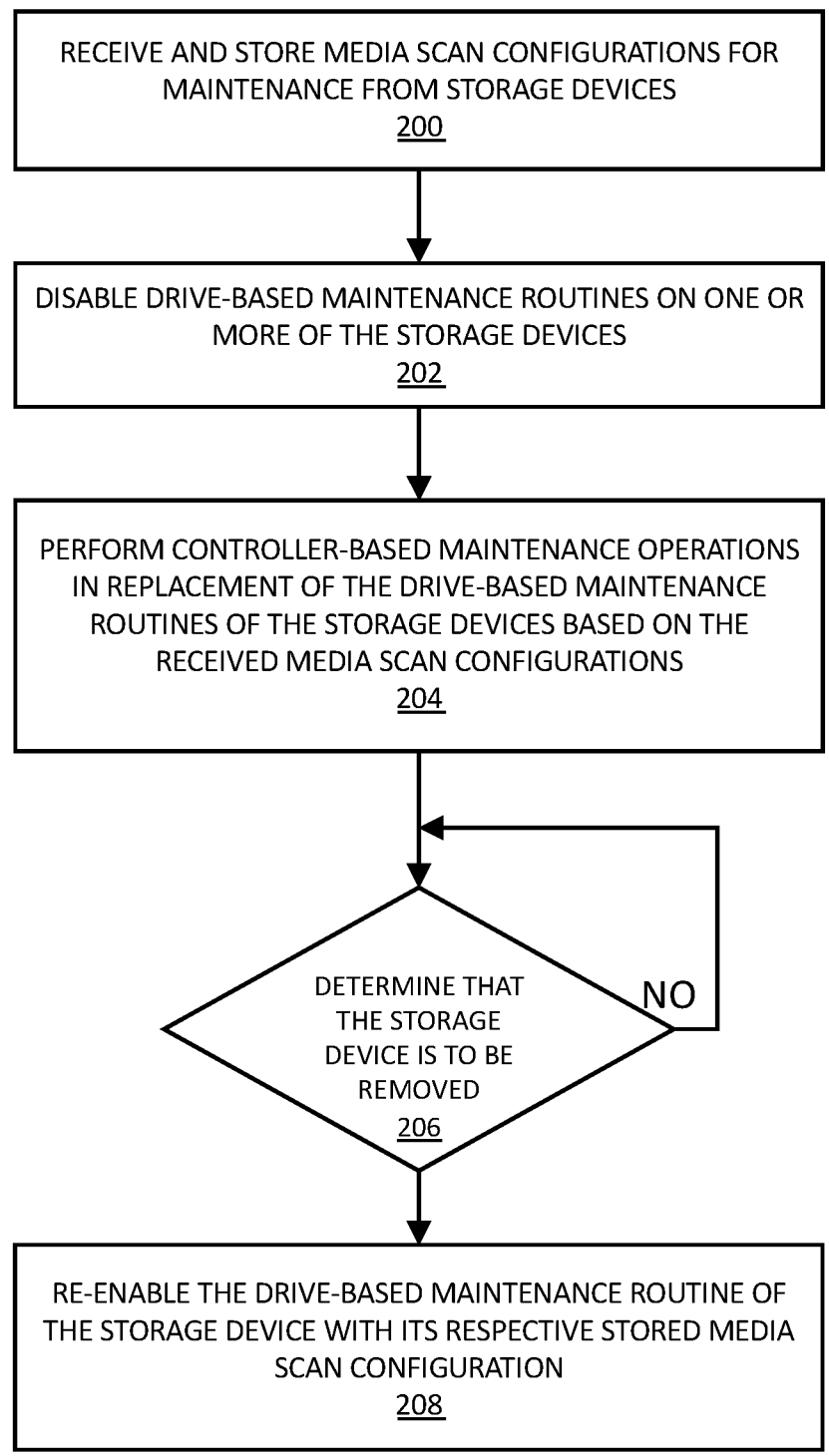
Figure 3:
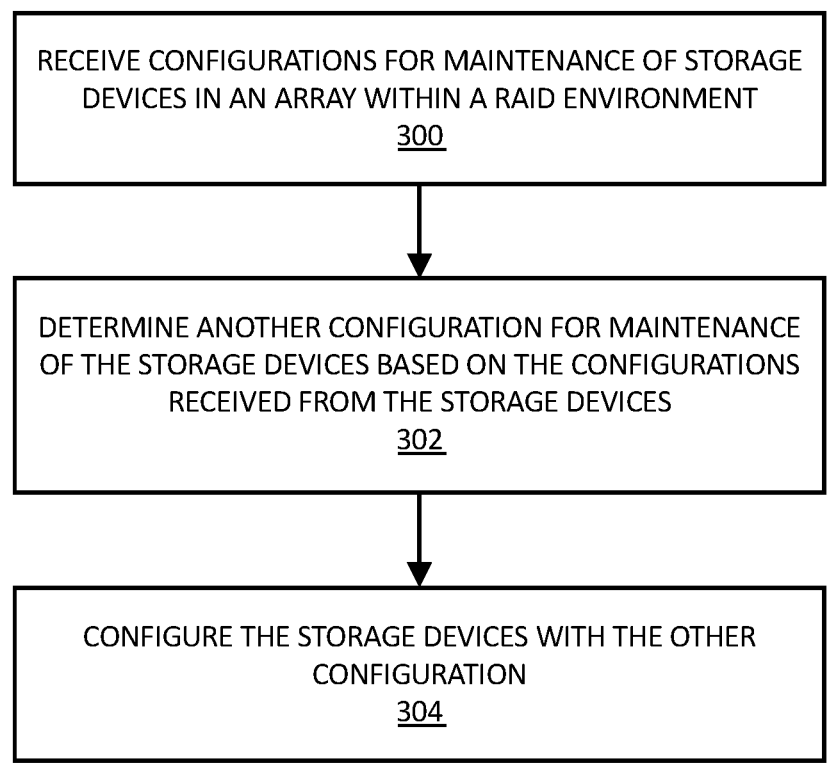

Having thus described the presently disclosed subject matter in general terms, reference will now be made to the accompanying Drawings, which are not necessarily drawn to scale, and wherein:

FIG. 1 is a block diagram showing a computer system including a storage controller 102 for configuring storage devices in accordance with embodiments;

FIG. 2 is a flow diagram of a method for implementing maintenance operations on storage devices in place of drive-based maintenance routines according to embodiments of the present disclosure; and FIG. 3 is a flow diagram of another method for configuring storage devices according to embodiments of the present disclosure.

SUMMARY

The presently disclosed subject matter relates to systems and methods for implementing maintenance operations on storage devices in place of drive-based maintenance operations. According to an aspect, a system includes a storage controller configured to receive a plurality of media scan configurations for maintenance from a plurality of storage devices. The storage controller is also configured to disable drive-based maintenance routines on one or more of the plurality of storage devices. Further, the storage controller is configured to perform controller-based maintenance operations in replacement of the drive-based maintenance routines of the one or more of the plurality of storage devices based on the received plurality of media scan configurations.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Unless otherwise defined, all technical terms used herein have the same meaning as commonly understood by one of ordinary skill in the art to which this disclosure belongs.

As referred to herein, the term "computing device" should be broadly construed. They may include any type of computing device, for example, a server, a desktop computer, a laptop computer, a mobile computer, or the like. In many examples described herein, systems, methods and processes are described as being implemented by a server, but it should be understood that they may alternatively be implemented by any suitable computing device.

As referred to herein, the terms "storage device" or "memory module" should be broadly construed and may also be referred to as data storage. Example storage devices include, but are not limited to, a hard disk drive (HDD), a solid state drive (SSD), tape drive, optical drive, or the like.

As referred to herein, the term "storage controller" is a device or component of a computing device for managing storage devices. For example, a storage controller can be part of a server for managing its various storage devices. A storage controller can perform maintenance operations on storage devices. Example maintenance operations include patrol reads, consistency check, and other such operations. A RAID controller is a type of storage controller for managing, for example, hard disk drives or solid state drives in a computer device or array an array of storage devices so that they work as a logical unit. The RAID controller can provide a degree of protection for stored data and can improve computing performance by reducing time needed to access stored data. A storage controller can offer a level of abstraction between an operating system and physical drives. A storage controller can present groups of or sections of drives to applications and operating systems as logical units for which data protection schemes can be defined. The logical units appear as storage devices or portions of storage devices (e.g., drives or portions of drives) to the applications and operating system even though they may comprise parts of multiple storage devices. It is noted that systems and methods described herein may also be implemented in a JBOD ("Just a Bunch of Disks") environment.

A storage controller can be a physical controller or any suitable type of hardware for managing multiple storage devices. A storage controller can be implemented as hardware, software, firmware, or combinations thereof. The storage controller can be implemented as a PCI Express card, which is configured to support a specific drive format. In some examples, a storage controller may be software-only, and utilize hardware resources of a host system, such as the host's CPU and DRAM. In accordance with embodiments, a storage controller is described as operating in a RAID environment, although it should be understood that the storage controller be utilized in any other suitable environment within a computing device.

As referred to herein, the term "media scan" is a process performed by a storage device or memory for error detection. A media scan can be implemented by and adhered to by the storage device. In other words, the storage device may maintain and store a media scan configuration of its specific processes for error detection. A media scan configuration may be set or recommended by the manufacturer of the storage device. Also, the media scan can be a background process (referred to as a "background media scan" or "BMS"). A background media scan can find media errors before they can disrupt reads and writes. A background media scan process can scan all volume data to confirm that it can be accessed. Any errors can be reported in an event log. Other example techniques of surface/data maintenance include, but are not limited to, identification of bad sectors/blocks—some may be beyond recovery and need to be recreated, while some may be recoverable. An example media scan can include a patrol read (PR) and/or consistency check (CC).

In accordance with embodiments, a storage controller can configure one or more storage devices A configuration of a storage device can include instructions for maintenance routines, patrol reads, consistency checks, media (or data) scan interval, and/or other drive parameters. The storage controller can implement the instructions for controlling the storage device. A background media scan (BMS) configuration can be stored within a storage device, and can be set by its manufacturer. A patrol read and/or consistency check configuration may be set and stored at a storage controller. A device external to the storage controller can receive media scan configurations for maintenance from storage devices, to disable drive-based maintenance routines on one or more of the storage devices, and to perform controller-based maintenance operations in replacement of the drive-based maintenance routines of the storage devices based on the received media scan configurations as described in more detail and by the examples set forth herein.

FIG. 1 illustrates a block diagram showing a computer system 100 including a storage controller 102 for configuring storage devices 104A-104N in accordance with embodiments. In this example, the storage controller 102 and its associated storage devices 104A-104N are operating within a RAID environment although it should be understood that they may operate within any other suitable computing environment. Referring to FIG. 1, the system 100 includes one or more host computing devices 106 operatively connected to the storage controller 102 and the storage devices 104A-104N, wherein "N" indicates that there may be any suitable number of storage devices.

In this example, the storage controller 102 may be a RAID controller, and the storage devices 104A-104N may be hard disk drives. Alternatively, the storage devices may be an SSD or any suitable type of permanent storage device, such as tape drives or optical drives. The storage devices 104A-104N are operatively connected to the storage controller 102 via a storage device transport medium 107. The storage device transport medium 107 and the protocols performed on it may include, but are not limited to, FibreChannel (FC), Advanced Technology Attachment (ATA), Serial Advanced Technology Attachment (SATA), Small Computer Systems Interface (SCSI), Serial Attached SCSI (SAS), Non-Volatile Memory Express (NVMe), HIPPI, ESCON, FICON, Ethernet, Infiniband, or combinations thereof. The storage devices 104A-104N may suitably communicate using stacked protocols, such as SCSI over FibreChannel or Internet SCSI (iSCSI). In an example, the storage controller 102 as implemented by a RAID controller may be operatively connected to a baseboard management controller (BMC) 111. The BMC 111 can provide support and interaction with the storage controller for providing configuration continuity and maintenance management. This can be a 2-way interaction between the BMC 111 and the storage controller 102. For example, the BMC 111 can provide instructions that the storage controller can follow (e.g., disable individual drive scans, etc.)—while if the storage controller takes and action, it also needs to inform the BMC 111 of the current configuration/status. As a result, the BMC 111 (or admin) can adjust if needed.

The storage devices 104A-104N can be grouped into redundant arrays 108. The redundant arrays 108 can be configured according to any suitable RAID level, such as RAID level 1, 2, 3, 4, 5, 6, 10, or 50. Further, the storage devices may be employed with non-redundant arrays, such as RAID 0 arrays.

A redundant array 108 of storage devices 104A-104N can be multiple storage devices which the storage controller 102 can present to the host computing device(s) 106 as a single logical disk. When a host computing device 106 requests the storage controller 102 to write data to one or more of the storage devices 104A-104N, the storage controller 102 writes the data to one or more of the storage devices 104A-104N of the redundant array 108 and also writes redundant data to one or more other storage devices in the redundant array 108. The redundant array may be a mirrored copy of the received data or parity data computed from the received data according to the various RAID levels. Writing the redundant data in addition to the received data enables the storage controller 102 to subsequently provide the data when the host computing device 106 requests it, even if one of the storage devices in the redundant array 108 has failed after the user data and the redundant data have been written to the redundant array 108. In the instance of a redundant array 108 based on mirroring, the storage controller 102 can read the failed storage devices data from the failed storage device's mirror storage device. In the instance of a redundant array 108 based on parity, the storage controller 102 can read the data store of the non-failed storage devices and can compute the parity of the data to obtain the failed storage device's data.

Some of the storage devices 104A-104N can be configured as spare storage devices. A spare storage device is a storage device that is not part of a redundant array 108, but rather is available for the storage controller 102 to automatically replace a storage device in a redundant array 108, either in the event of a reconstruct in response to a failure of a storage device in the redundant array 108, or in the event of a preemptive reconstruct in response to a non-fatal storage device error.

Host computing devices 106 may include, but are not limited to, workstations, personal computer, notebook computers, file servers, print servers, enterprise servers, mail servers, web servers, database servers, and the like. The host computing device(s) 106 may be operative connected to the storage controller 102 via a host transport medium 110. The host transport medium 110 and the protocols performed on it may include, but are not limited to, FibreChannel (FC), Ethernet, Infiniband, TCP/IP, Small Computer Systems Interface (SCSI), HIPPI, Token Ring, Arcnet, FDDI, LocalTalk, ESCON, FICON, ATM, SAS, SATA, NVMe, and/or the like. The storage controller 102 can receive I/O requests from the host computing device(s) 106 via the host transport medium 110. To transfer user data between the host computing device(s) 106 and the redundant arrays 108 of storage devices via the host transport medium 110. The host transport medium 110 may be part of a network including links, switches routers, etc.

The storage controller 102 includes memory 112, a processor 114, a bus bridge 116, a host interface adapter 118, and a storage device interface adapter 120. The host interface adapter 118, storage device interface adapter 120, and processor 114 can each operatively connected to the bus bridge 116 by a corresponding local bus. The processor 114 can be operatively connected to memory 112 for storing instructions and data for execution by the processor 114. For example, the memory 112 can store instructions for implementing various functionalities, such as performing controller-based maintenance operations in replacement of drive-based maintenance routines of the storage devices 104A-104N described herein according to embodiments of the present disclosure.

The storage controller 102 can receive configuration information from one or more of the storage devices 104A-104N. For example, the storage controller 102 can receive media scan configurations, such as media scan frequency configurations, for maintenance of the storage devices and use this information for performing controller-based maintenance operations in replacement of the drive-based maintenance routines of the storage devices 104A-104N. Implementation of these controller-based maintenance routines can optimize the efficient maintenance of the storage device 104A-104C. Particularly, for example, these routines can be used to coordinate background media scan activities with controller-driven patrol read and consistency checks. This can avoid the independent drive-based maintenance routines of the storage devices that can result in redundant maintenance, sometimes at the expense of long wear on expensive validation exercise.

For example, FIG. 2 illustrates a flow diagram of a method for implementing maintenance operations on storage devices in place of drive-based maintenance routines according to embodiments of the present disclosure. This method is described by example as being implemented by the system 100 shown in FIG. 1. Although, it is noted that the method may alternatively be implemented in another suitable system including a storage controller and storage devices.

Referring to FIG. 2, the method includes receiving and storing 200 media scan configurations for maintenance from storage devices. As an example, one or more of the storage devices 104A-104N may be installed and operatively connected to the storage controller 102 shown in FIG. 1. The storage controller 102 may recognize the storage devices 104A-104N and establish communication with the storage devices 104A-104N. The storage controller 102 can receive information regarding configuration of one or more of the storage devices 104A-104N. For example, mode pages of a storage device can be read and the manufacturer configuration settings understood by the storage controller 102. This manufacturer configuration information may be stored on the storage device 102. The storage controller 102 can store the received media scan configurations in memory 112.

A storage device may have a configuration, for example, that specifies drive parameters. Example configurations received from the storage devices 104A-104N include media scan and scan interval configurations; controllers may have similar such instructions for patrol reads, consistency checks, scan intervals, and the like. Storage devices can perform a media scan in the background. Patrol reads/ consistency checks can be implemented by the controller since it can recreate data if needed from the higher level RAID array. The individual disk may be searching for sectors/blocks that may be going bad or unusable for remapping that sector/block to another physical location before it is un-readable. The storage devices 104A-104N can be manufactured with one or more of these configurations as default settings. The storage controller 102 can receive these configurations and implement them for the storage devices 104A-104N as described in more detail herein.

The method of FIG. 2 includes disabling 202 drive-based maintenance routines on one or more of the storage devices. Continuing the aforementioned example, the storage controller 102 can send a command to the storage devices 104A-104N to disable their drive-based maintenance routines. For example, drive-based maintenance routines can include drive-based media scans. These routines may be disabled such that they can be replaced with optimized controller-based maintenance operations (e.g., PR and CC operations) for avoiding redundant maintenance of the storage devices 104A-104N.

Further regarding disabling storage devices, it is noted that the drive-based maintenance routines may only be disabled for a selected subset of the storage devices 104A-104N. The storage devices 104A-104N that are not selected by the storage controller 102 may be the storage devices that have a high media scan frequency requirement. In this instance, the storage controller 102 may only perform the controller-based maintenance operations on the storage devices having the low media scan frequency requirement. It is noted that the drives not selected may also not be part of a RAID array group, and therefore the controller may not use its own patrol read/CC operations on those but rather let the individual disk handle that background scan.

The method of FIG. 2 includes performing 204 controller-based maintenance operations in replacement of the drive-based maintenance routines of the storage devices based on the received media scan configurations. Continuing the aforementioned example, the storage controller 102 can determine a controller-based maintenance operation for maintenance of one or more of the storage devices 104A-104N based on the media scan configurations received configuration from the storage device (s) 104A-104N. For example, the storage controller 102 may have stored in memory 112 instructions for this controller-based maintenance operation, which is used to replace the drive-based maintenance routines of the storage device (s) 104A-104N. This controller-based maintenance operation can be an operation that balances the requirements of each storage device while also optimizing performance and reducing wear.

In embodiments, the controller-based maintenance operations can be performed at a frequency that meets the requirements of all of the storage devices 104A-104N. For example, the set frequency can be the lowest media scan interval that still meets the demands of the highest media scan interval among the storage devices 104A-104N. In this example, the storage controller 102 can determine the lowest media scan interval among the storage devices 104A-104N that still meets the demands of the highest media scan interval required among the storage devices 104-104N. In a particular example, the frequency can be set to the media scan interval that is the highest among the storage devices for use in performing controller-based maintenance operations. At first impression, this methodology suggests drives are being forced to be scanned at least as quickly as the least common denominator of the group and that this would be counter productive to minimizing wear. This would be true, except it is intended to disable the drive media scan and rely on the controller scans where present.

In embodiments, all drives can be disabled and the storage controller 102 can set media scan operations to occur at least as frequently as the strictest drive requirement. In other embodiments, the storage devices with the most frequent scan requirements can be left unchanged, and the storage controller 102 can only manage the others with controller-based maintenance routines as described herein.

In another example of determining maintenance operations for the storage devices 104A-104N, the storage controller 102 can request updates through the storage device interface adapter 120. These updates can be an overall storage subsystem configuration for the storage devices 104A-104N. Particularly, the storage controller 102 can recognize system usage patterns and generate a configuration for maintenance operations that enhances intervals and idle time, such as historical load scheduling. Further, for example, the storage controller 102 can gather and synthesize ECC failures/sector moves discovered in maintenance against parameters such as age and read performance, error location learning, and optimization of full checks versus partial patrol reads.

As the storage controller 102 discovers errors, this data can be used by an optimization algorithm to evaluate the current maintenance operations. In this example, if no errors are discovered, then the maintenance operations may be adjusted to not run as frequently. On the other hand, if errors are discovered, then the maintenance operations may be adjusted to run more frequently. It is also noted that if there is an identifiable maintenance window that is small relative to the maintenance that needs to be done, then the storage controller 102 may determine not to use the most wear-efficient algorithm. In this case, the storage controller 102 may determine to increase the frequency to be more time efficient than wear efficient.

It is noted that frequency can be decided by factors other than past errors. For example if the BMC knows that the temperature of the system has been running hot for the past day/week/month, it can increase the frequency of the scans. If there are new storage devices inserted into the computer system, the frequency may be high at first to determine if that disk is reliable (there is a failure occurrence known as early failure rate—typically you may see failures in the early part of a lifecycle of a device, and then much further out in time). A BMC can be aware of these types of external events or higher level configuration that can help control the scans.

In another example of determining maintenance operations for the storage devices 104A-104N, the storage controller 102 can analyze BMS intervals across the storage devices 104A-104N. The storage controller 102 can analyze the BMS intervals with the smallest BMS interval and can set an operation configuration either a PR or CC that creates an effective BMS of at least that minimal interval. If the usage is round robin, then further PR and CC schedule reduction can be implemented for maintenance operations.

In accordance with embodiments, configuration coordination can be implemented in a scenario in which handoff of the BMS is passed to the storage controller 102 with the knowledge of the storage device. While storage device manufacturer implementations can vary, BMS reading can generally implemented with reduced ECC tolerance to recognize marginal reads. The storage device may be informed that this is a BMS type operation with a specialized priority read. This can allow normal drive recovery of marginal reads but do so during the non-user impacting drive/array maintenance thread.

In other embodiments, the storage controller 102 can optimize PR and CC runs with the knowledge of specified maintenance intervals operating with a storage device. For example, the storage controller 102 can receive informed guidance of a storage device's charge stability by reading those intervals and thereby tailor the PR and CC frequency accordingly.

In yet other embodiments, the storage controller logic can be enhanced by the processing available within the BMC to optimize between PR and CC settings. As an example, if one drive is seeing errors more than others, that drive can be part of more frequent PR and the CC interval for the other members of the array may be extended. In this example approach, the drive experiencing the errors can suffer the wear individually rather than forcing the entire array to do CC.

The method of FIG. 2 also includes determining 206 that one of the storage devices is to be removed from the RAID environment. Further, in response to determining that the storage device is to be removed, the method includes re-enabling 208 the storage device with its respective stored media scan configuration. Continuing the aforementioned example, the storage controller 102 may receive notification that the storage device 104A is being removed from the array. In this instance, the storage device 104A can use the stored configuration settings of the storage device 104A that were specified initially in the storage device 104 to replace the current configuration settings in the storage device 104A. In this way, upon removal the storage device 104A can be returned to its manufacturer set configuration.

FIG. 3 illustrates a flow diagram of another method for configuring storage devices according to embodiments of the present disclosure. This method is described by example as being implemented by the system 100 shown in FIG. 1. Although, it is noted that the method may alternatively be implemented in another suitable system including a storage controller and storage devices. This method can be used to set an optimized maintenance routine of one or more storage devices with another configuration different from their stored configuration for minimizing drive maintenance. As a result, efficiency of performance is improved and wasteful drive maintenance is minimized or at least reduced.

Referring to FIG. 3, the method includes receiving 300 configurations for maintenance of storage devices in an array within the RAID environment. For example, each storage device 104A-104C within the array 108 can store a configuration for preserving the data stored on their devices subject to their own technical experiences and expectation. As an example, each storage device 104A-104C can store instruction for its background media scan (BMS). These configurations can be different among the different storage devices 104A-104C as each can be made by a different manufacturer and thus have different prescribed configuration settings. An example of these setting is the background media scan (BMS) information stored within each storage device 104A-104C. BMS is an internal maintenance process for maintaining data integrity and long-term health of the storage device.

The method of FIG. 3 includes determining 302 another configuration for maintenance of the storage devices based on the configurations received from the storage devices. Continuing the aforementioned example, the storage controller 102 shown in FIG. 1 can access the BMS information stored at each of the storage devices 104A-104C. For example, the storage controller 102 can use the storage device interface adapter 120 to read the BMS from each of the storage devices 104A-104C and use that to inform the configuration of the RAID controller's PR and CC. The storage controller 102 can analyze the BMS information for each storage device 104A-104C for determining an optimized controller PR and CC configuration. As an example, the storage controller 102 can set a replacement configuration for the PR and/or the CC for the array that is the minimal interval for each storage device BMS.

The method of FIG. 3 includes configuring 304 the storage device with the second BMS configuration that can involve disabling it and choosing PR/CC settings that effect similar data protection. Continuing the aforementioned example, the storage controller 102 can synthesize the BMS information derived from the devices with their own CC/PR configuration or background media scan to create a configuration for the storage devices 104A-104C in the RAID environment (BMS) as well as the controller configuration (e.g., PR/CC). For example, even if the optimized configuration for PR and/or CC has been calculated on a given device configuration, that replacement optimized PR and CC may not be optimal if the array is serviced with a different storage device having a different default BMS setting. In that case, the algorithms may need to be re-run, based on the different array components and may choose different settings for the BMS (if left enabled) and for the PR and CC. These example cases illustrate that, the BMS at the storage devices 104A-104C can be supplanted by a knowledge-based, logical setting of the PR and/or CC. Particularly, for example, the BMS may be disabled after setting the PR and CC.

As a result of re-configuring the storage devices, an optimized maintenance routine is set that can meet specified maintenance requirements of each storage device and also optimize their maintenance routines. As a result, efficiency of performance is improved and wasteful drive maintenance is reduced or minimized.

It is noted that a storage device may be returned to its original configuration setting when it leaves the RAID environment. The storage controller 102 may determine that one or more of the storage devices are leaving the RAID environment and thereby write to the memory of the storage device its original configuration. In the case of a hot-removal, the storage device can also know to go back to its device settings if it is imported into a different storage controller/RAID array (i.e., removing disk from one controller for the purpose of using it in another; not the data itself but just the disk as a re-purposing effort).

In accordance with embodiments, changes to configuration may be suitably shared among controllers and storage devices. For example, drive parameters such as BMS, and RAID controller parameters like CC, and PR configuration information may be distributed as needed among controllers and storage devices. Further, the initial settings of such controllers and storage devices can be set back to their original configurations upon planned removal of one or more storage devices.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE ° smart phone, a BLACKBERRY® smart phone, a NEXUS ONE™ smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, ReFLEX, iDEN, TETRA, DECT, DataTAC, Mobitex, EDGE and other 2G, 3G, 4G, 5G, and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
a storage controller configured to:
receive a plurality of media scan configurations for maintenance from a plurality of storage devices;
determine controller-based maintenance operations for one or more of the plurality of storage devices for optimizing performance and/or wear based on the received plurality of media scan configurations, wherein the controller-based maintenance operations meet at least minimum requirements for memory storage maintenance operations of all of the one or more of the plurality of storage devices;
disable drive-based maintenance routines on one or more of the plurality of storage devices; and
perform the controller-based maintenance operations in replacement of the drive-based maintenance routines of the one or more of the plurality of storage devices.

2. The system of claim 1, wherein the plurality of media scan configurations comprises media scan frequency configurations.

3. The system of claim 1, wherein the drive-based maintenance routines comprise drive-based media scans.

4. The system of claim 1, wherein the controller-based maintenance operations comprise patrol read and/or consistency check operations.

5. The system of claim 1, wherein the storage controller performs the controller-based maintenance operations at a frequency that meets requirements of all of the one or more of the plurality of storage devices.

6. The system of claim 1, wherein the one or more of the plurality of storage devices comprises all of the plurality of storage devices.

7. The system of claim 1, wherein the one or more of the plurality of storage devices comprises a selected subset of the plurality of storage devices, and wherein the media scan configurations of the devices not selected are not selected based on comprising a higher media scan frequency requirement.

8. The system of claim 1, wherein the storage controller is configured to:
- determine a highest media scan interval among the plurality of storage devices; and
- perform controller-based maintenance operations according to the highest media scan interval.

9. The system of claim 1, wherein the storage controller is configured to:
- store the plurality of media scan configurations; and
- re-enable the drive-based maintenance routine of a storage device of the one or more of the plurality of storage devices based on a respective stored media scan configuration of the storage device being re-enabled.

10. The system of claim 1, wherein the storage controller controls the plurality of storage devices in a redundant array of independent disks (RAID) environment.

11. The system of claim 1, wherein the storage controller is configured to:
- store a media scan configuration of a storage device among the plurality of storage devices;
- determine that the storage device among the plurality of storage devices is to be removed; and
- configure the storage device among the plurality of storage devices with the stored media scan configuration in response to determining that the storage device is to be removed.

12. The system of claim 1, wherein the plurality of storage devices comprise hard disk drive (HDD) and/or a solid state drive (SSD).

13. A method comprising:
at storage controller:
- receiving a plurality of media scan configurations for maintenance from a plurality of storage devices;
- determining controller-based maintenance operations for one or more of the plurality of storage devices for optimizing performance and/or wear based on the received plurality of media scan configurations, wherein the controller-based maintenance operations meet at least minimum requirements for memory storage maintenance operations of all of the one or more of the plurality of storage devices;
- disabling drive-based maintenance routines on one or more of the plurality of storage devices; and
- performing the controller-based maintenance operations in replacement of the drive-based maintenance routines of the one or more of the plurality of storage devices.

14. The method of claim 13, wherein the plurality of media scan configurations comprises media scan frequency configurations.

15. The method of claim 13, wherein the drive-based maintenance routines comprise drive-based media scans.

16. The method of claim 13, wherein the controller-based maintenance operations comprise patrol read and/or consistency check operations.

17. The method of claim 13, wherein the storage controller performs the controller-based maintenance operations at a frequency that meets requirements of all of the one or more of the plurality of storage devices.

18. The method of claim 13, wherein the one or more of the plurality of storage devices comprises a selected subset of the plurality of storage devices, and wherein the media scan configurations of the devices not selected are not selected based on comprising a higher media scan frequency requirement.

19. The method of claim 13, further comprising:
- storing the plurality of media scan configurations; and
- re-enabling the drive-based maintenance routine of a storage device of the one or more of the plurality of storage devices based on a respective stored media scan configuration of the storage device being re-enabled.

20. The method of claim 13, further comprising determining an ability to optimize the configuration of consistency checks and patrol reads based on error experience of the plurality of storage devices.

* * * * *